(12) United States Patent
Chen et al.

(10) Patent No.: US 12,340,114 B2
(45) Date of Patent: Jun. 24, 2025

(54) APPEND-ONLY DATA ACCESS METHOD AND APPARATUS

(71) Applicant: Huawei Technologies Co., Ltd., Shenzhen (CN)

(72) Inventors: Yu Chen, Shenzhen (CN); Zhong Qin, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 178 days.

(21) Appl. No.: 17/554,843

(22) Filed: Dec. 17, 2021

(65) Prior Publication Data

US 2022/0107752 A1 Apr. 7, 2022

Related U.S. Application Data

(63) Continuation of application No. PCT/CN2020/094027, filed on Jun. 2, 2020.

(30) Foreign Application Priority Data

Jun. 19, 2019 (CN) .......................... 201910533925.5

(51) Int. Cl.
*G06F 3/06* (2006.01)
*G06F 21/78* (2013.01)

(52) U.S. Cl.
CPC .......... *G06F 3/0655* (2013.01); *G06F 3/0604* (2013.01); *G06F 3/0679* (2013.01); *G06F 21/78* (2013.01)

(58) Field of Classification Search
None
See application file for complete search history.

(56) References Cited

U.S. PATENT DOCUMENTS 9,411,528 B1 * 8/2016 McGarry .............. G06F 3/0655
9,502,102 B1 * 11/2016 Kumar ................ H10N 70/245
(Continued)

FOREIGN PATENT DOCUMENTS

CN 105404596 A 3/2016
CN 107203330 A 9/2017
(Continued)

OTHER PUBLICATIONS

Dulloor et al., "System Software for Persistent Memory," Computer Systems, ACM, 2 Penn Plaza, Suite 701 New York NY 10121-0701 USA, XP058048181, Total 16 pages (Apr. 14, 2014).
(Continued)

*Primary Examiner* — Edward J Dudek, Jr.
*Assistant Examiner* — Ralph A Verderamo, III
(74) *Attorney, Agent, or Firm* — Leydig, Voit & Mayer, Ltd.

(57) ABSTRACT

This application discloses a data access method and apparatus, and relates to the storage field. In this application, a write request is received; a destination address of a memory area corresponding to to-be-written data is obtained based on address indication information included in the write request; and the to-be-written data is written, in an append write manner, into the memory area indicated by the destination address. After the to-be-written data is written into the memory area, a read/write attribute corresponding to the destination address is set, so that data in the memory area cannot be modified, thereby effectively avoiding illegal tampering with the data stored in the memory area, and implementing read-only protection on data in a storage class memory (SCM) medium.

6 Claims, 5 Drawing Sheets

(56) References Cited

U.S. PATENT DOCUMENTS

| | | | | |
|---|---|---|---|---|
| 9,507,843 | B1* | 11/2016 | Madhavarapu | G06F 16/2358 |
| 11,061,609 | B2* | 7/2021 | Beauchamp | G06F 3/0644 |
| 2006/0095687 | A1* | 5/2006 | Hsu | G06F 3/0674 |
| 2009/0172321 | A1* | 7/2009 | Scheuerlein | G06F 12/1425 |
| | | | | 711/170 |
| 2013/0318277 | A1* | 11/2013 | Dalal | G06F 13/28 |
| | | | | 710/308 |
| 2014/0040593 | A1* | 2/2014 | Sharp | G06F 12/1009 |
| | | | | 711/E12.059 |
| 2017/0103234 | A1 | 4/2017 | Rizzo et al. | |
| 2017/0111450 | A1* | 4/2017 | Zhou | H04L 12/18 |
| 2019/0377574 | A1* | 12/2019 | Weimer | G06F 9/3004 |
| 2020/0310665 | A1* | 10/2020 | Hansen | G06F 3/0622 |

FOREIGN PATENT DOCUMENTS

| | | |
|---|---|---|
| CN | 108628542 A | 10/2018 |
| WO | 2021096566 A1 | 5/2021 |

OTHER PUBLICATIONS

Anonymous: "write(2)—Linux manual page," XP055923300, Total 4 pages (Jun. 8, 2019).

* cited by examiner

APPEND-ONLY DATA ACCESS METHOD AND APPARATUS

CROSS-REFERENCE TO RELATED APPLICATIONS

This application is a continuation of International Application No. PCT/CN2020/094027, filed on Jun. 2, 2020, which claims priority to Chinese Patent Application No. 201910533925.5, filed on Jun. 19, 2019. The disclosures of the aforementioned applications are hereby incorporated by reference in their entireties.

TECHNICAL FIELD

This disclosure relates to the storage field, and in particular, to a data access method and apparatus.

BACKGROUND

A storage class memory (SCM) medium is a new medium form to which the industry is currently paying attention, and is usually referred to as a persistent memory medium or a non-volatile storage medium. The SCM medium is characterized by non-volatility and fast access.

In a related technology, when accessing an SCM medium, a central processing unit (CPU) usually performs access in a local update manner. That is, for a memory area in the SCM medium that has been allocated and has not been reclaimed, the CPU may update, for a plurality of times, data stored in the memory area. In this case, the data in the SCM medium is easily tampered with illegally, resulting in damage of the data stored in the SCM medium.

SUMMARY

This application provides a data access method and apparatus. The technical solutions are as follows:

According to a first aspect, a data access method is provided. The method includes: receiving a write request, where the write request includes to-be-written data and address indication information; obtaining, based on the address indication information, a destination address of a memory area corresponding to the to-be-written data, where the memory area is space in a storage class memory SCM; writing, in an append write manner, the to-be-written data into the memory area indicated by the destination address; and after the to-be-written data is written into the memory area, setting a read/write attribute corresponding to the destination address, so that data in the memory area cannot be modified.

In this embodiment of this application, the write request is received, the destination address of the memory area corresponding to the to-be-written data is obtained based on the address indication information included in the write request, and the to-be-written data is written into the memory area in the append write manner. After the to-be-written data is written into the memory area, the read/write attribute corresponding to the destination address is set, so that the data in the memory area cannot be modified, thereby effectively avoiding illegal tampering with the data stored in the memory area, and implementing read-only protection on data in an SCM medium.

Optionally, the setting a read/write attribute corresponding to the destination address includes: setting the read/write attribute of a page table entry corresponding to the destination address to a read only attribute.

Optionally, before the to-be-written data is written into the memory area, the method further includes: determining that the read/write attribute of the page table entry corresponding to the destination address is not the read only attribute. When the read/write attribute of the page table entry corresponding to the destination address is not the read only attribute, it indicates that the memory area indicated by the destination address is not a read only area, and data is allowed to be written. In this case, the to-be-written data can be written into the memory area.

Optionally, the read/write attribute of the page table entry is stored in a memory management unit (MMU).

Optionally, the read/write attribute of the page table entry is stored in an input-output memory management unit (IOMMU).

The memory area of the SCM may be accessed through a CPU core and the MMU, or may be accessed through an I/O device and the IOMMU. The MMU and the IOMMU each store a page table used to convert a logical address into a physical address.

According to a second aspect, a data access apparatus is provided. The data access apparatus has a function of implementing behavior of the data access method in the first aspect. The data access apparatus includes at least one module, and the at least one module is configured to implement the data access method provided in the first aspect.

According to a third aspect, a data access apparatus is provided. A structure of the data access apparatus includes a processor and a memory. The memory is configured to: store a program that supports the data access apparatus in performing the data access method provided in the first aspect, and store data used to implement the data access method provided in the first aspect. The processor is configured to execute the program stored in the memory. An operation apparatus of the data access apparatus may further include a communication bus, and the communication bus is used to establish a connection between the processor and the memory.

According to a fourth aspect, a computer-readable storage medium is provided. The computer-readable storage medium stores instructions. When the instructions are run on a computer, the computer is enabled to perform the data access method according to the first aspect.

According to a fifth aspect, a computer program product including instructions is provided. When the computer program product runs on a computer, the computer is enabled to perform the data access method according to the first aspect.

Technical effects obtained in the second aspect, the third aspect, the fourth aspect, and the fifth aspect are similar to technical effects obtained by the corresponding technical means in the first aspect, and details are not described herein again.

Beneficial effects brought by the technical solutions provided in this application include at least the following:

In the embodiments of this application, the write request is received, the destination address of the memory area corresponding to the to-be-written data is obtained based on the address indication information included in the write request, and the to-be-written data is written into the memory area in the append write manner. After the to-be-written data is written into the memory area, the read/write attribute corresponding to the destination address is set, so that the data in the memory area cannot be modified, thereby effectively avoiding illegal tampering with the data stored in the memory area, and implementing read-only protection on data in an SCM medium.

DESCRIPTION OF EMBODIMENTS

To make the objectives, technical solutions, and advantages of this application clearer, the following further describes the implementations of this application in detail with reference to the accompanying drawings.

Before embodiments of this application are described in detail, an implementation environment of the embodiments of this application is described first.

Figure 1:
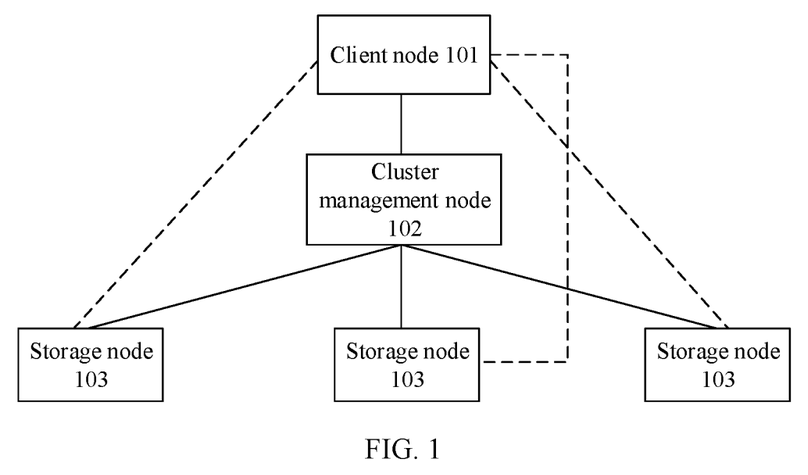
FIG. 1 is a schematic diagram of a distributed storage system involved in a data access method according to an embodiment of this application.

FIG. 1 is a schematic diagram of a distributed storage system involved in a data access method according to an embodiment of this application. As shown in FIG. 1, the system includes a client node 101, a cluster management node 102, and a plurality of storage nodes 103.

The client node 101 may separately communicate with the cluster management node 102 and the plurality of storage nodes 103, and the cluster management node 102 may also communicate with the plurality of storage nodes 103.

It should be noted that the cluster management node 102 is configured to manage the plurality of storage nodes 103. To ensure that data is evenly stored in the plurality of storage nodes 103, routing is usually performed in a distributed hash table manner when a storage node is selected. According to the distributed hash table manner, a hash ring may be evenly divided into several parts, each part is referred to as one partition, and each partition corresponds to one or more storage nodes 103. The cluster management node 102 may maintain partition information of each partition in the system, and the cluster management node 102 may be configured to manage allocation of a plurality of partitions in the system. For example, after receiving a request that is sent by the client node 101 and that is used to apply for partition information of a partition, the cluster management node 102 may allocate an appropriate partition to the client node 101 based on load of each maintained partition, feed back partition information of the allocated partition to the client node 101, so that the client node 101 can access data based on the partition information.

The client node 101 may be a client server. When accessing data, the client node 101 may interact with the cluster management node 102 to obtain partition information, and further communicate with a storage node 103 corresponding to a partition corresponding to the obtained partition information to read and write data. For example, when writing data, the client node 101 may send, to the cluster management node 102, a request used to apply for partition information of a partition. The cluster management node 102 may feed back, to the client node 101, partition information of a partition allocated to the client node 101. After receiving the partition information, the client node 101 may write the data into the storage node corresponding to the partition corresponding to the partition information.

Each storage node 103 may receive a data access request sent by the client node 101, and respond to the data access request from the client node 101 by using the data access method provided in this embodiment of this application. The data access request may be an append write request. "Append write" means to arrange written data in a writing time sequence. In addition, after a process of a program writes data in this manner, the process subsequently does not perform a write operation but only perform a read operation on an area in which the data is located.

Figure 2:
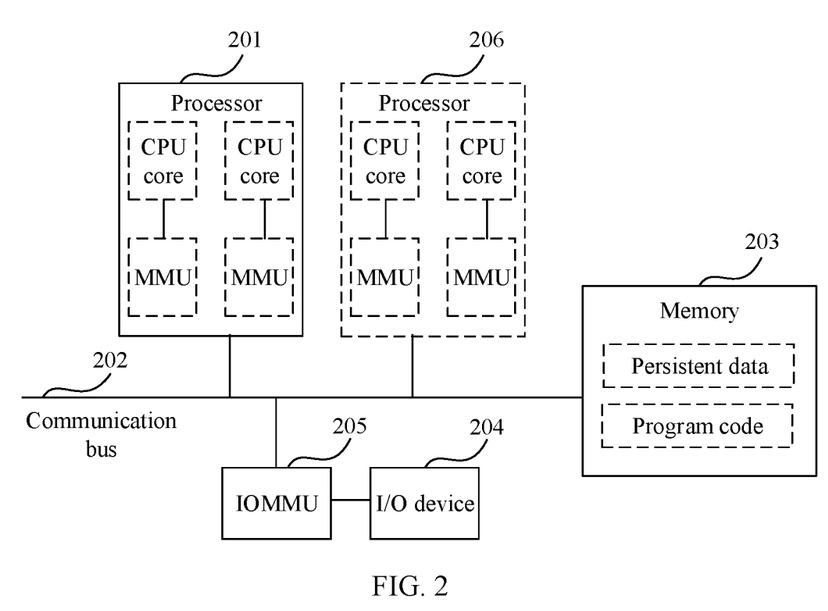
FIG. 2 is a schematic structural diagram of a storage node according to an embodiment of this application.

FIG. 2 is a schematic structural diagram of a storage node according to an embodiment of this application. The storage node in the distributed storage system in FIG. 1 may be implemented by the storage node shown in 2. Referring to FIG. 2, the storage node includes at least one processor 201, a communication bus 202, a memory 203, an input/output (I/O) device 204, and an input-output memory management unit (IOMMU) 205.

The processor 201 may be a general-purpose central processing unit (CPU). The processor 201 may include one or more CPU cores 2011 and one or more memory management units (MMU) 2012.

Optionally, in a possible implementation, the MMU 2012 may alternatively be independent of the CPU.

The communication bus 202 may include a path for transferring information between the foregoing components.

The memory 203 may be an SCM medium such as a phase-change memory (PCM), a resistive random access memory (ReRAM), or a magnetic random access memory (MRAM). The memory 203 may exist independently, and is connected to the processor 201 by using the communication bus 202. Alternatively, the memory 203 may be integrated with the processor 201. The memory 203 is configured to store persistent data.

It should be noted that the CPU core 2011 may access the memory 203 through the MMU 2012. For example, the CPU core 2011 may transmit a to-be-accessed logical address to the MMU 2012; and the MMU 2012 may convert the logical address into a physical address based on a stored first page table, and further access the memory 203 by using the physical address. The first page table stores a mapping relationship between a logical address accessible to a CPU and a physical address.

The input/output device 204 may access the memory 203 through the IOMMU 205 to read data from the memory 203.

It should be noted that the I/O device 204 may send a to-be-accessed logical address to the IOMMU 205, and the IOMMU 205 may convert the received logical address into a physical address based on a stored second page table, and further access the memory 203 by using the physical address. The second page table stores a mapping relationship between a logical address accessible to the input output device and a physical address. It should be noted that the I/O device 204 may be a remote direct memory access (RDMA) network card.

During specific implementation, in an embodiment, the storage node may include a plurality of processors, for example, the processor 201 and a processor 206 that are shown in FIG. 2. Each of these processors may be a single-core processor or a multi-core processor. The processor herein may be a processing core configured to process data (for example, computer program instructions).

The storage node may be a general-purpose computer device or a dedicated computer device. During specific implementation, the storage node may be a desktop computer, a laptop computer, a network server, a palmtop computer (PDA), a mobile phone, a tablet computer, a wireless terminal device, a communication device, or an embedded device. A type of the computer device is not limited in this embodiment of the present disclosure.

The memory 203 is further configured to store program code for executing the solutions of this application, and the processor 201 controls the execution. The processor 201 is configured to execute the program code stored in the memory 203. The program code may include one or more software modules. The storage node in the distributed storage system shown in FIG. 1 may access data by using the processor 201 and the one or more software modules in the program code in the memory 203.

The following describes the data access method provided in the embodiments of this application.

Figure 3:
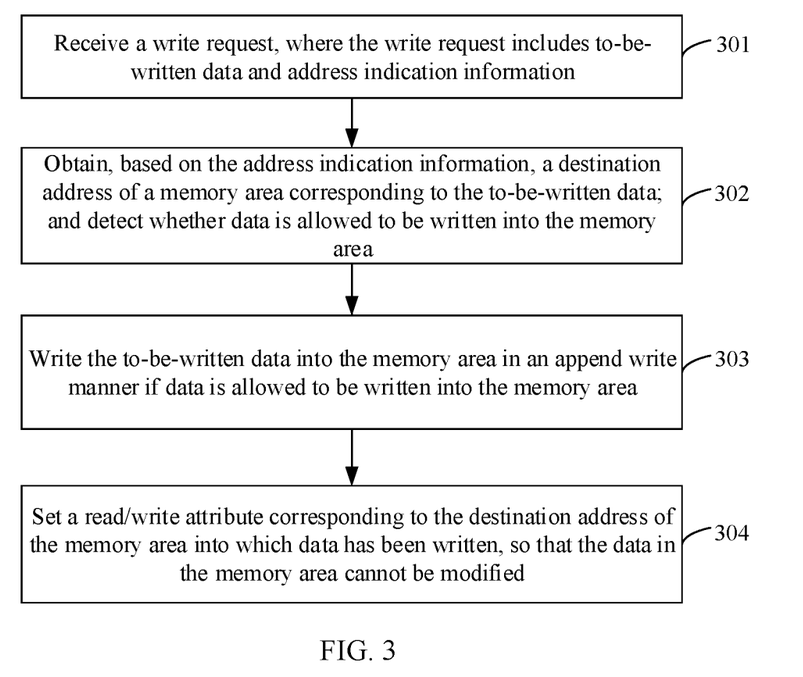
FIG. 3 is a flowchart of a data access method according to an embodiment of this application.

FIG. 3 is a flowchart of a data access method according to an embodiment of this application. The method may be applied to the distributed storage scenario shown in FIG. 1, and is performed by the storage node shown in FIG. 2. Referring to FIG. 3, the method includes the following steps.

Step 301: Receive a write request, where the write request includes to-be-written data and address indication information.

In this embodiment of this application, a storage node receives the write request sent by a client node. The write request may carry the to-be-written data, and the to-be-written data is data requested to be written into the storage node.

It should be noted that, based on different client nodes, the write request may be a write request that is received by an I/O device of the storage node, or may be a write request that is not received by an I/O device.

In addition, an appending write request is a write request sent in an append (append only) manner. The append write manner means to arrange written data in a writing time sequence. In addition, after a process of a program writes data in this manner, the process subsequently does not perform a write operation but only perform a read operation on an area in which the data is located.

Step 302: Obtain, based on the address indication information, a destination address of a memory area corresponding to the to-be-written data; and detect whether data is allowed to be written into the memory area.

After receiving the write request, the storage node may determine, based on the address indication information included in the write request, the destination address of the memory area corresponding to the to-be-written data; determine a read/write attribute of a page table entry corresponding to the destination address; and when the read/write attribute of the page table entry corresponding to the destination address is not a read only attribute, determine that data is allowed to be written into the memory area.

In this embodiment of this application, the address indication information may include an offset and a data length of the to-be-written data. The offset is used to indicate length information of an area into which data is currently written in a memory area allocated to a program corresponding to the to-be-written data. The storage node may determine, based on the offset, a start logical address of the memory area corresponding to the to-be-written data. Subsequently, the storage node may determine an end logical address of the memory area based on the start logical address of the memory area and the data length of the to-be-written data. All logical addresses of the memory area between the start logical address and the end logical address are used as destination addresses of the memory area.

After the destination address of the memory area is determined, when the write request is not a write request received by the I/O device, it indicates that the write request is a write request that needs to access an SCM medium through a CPU core and an MMU. In this case, the storage node may send the destination address of the memory area to the MMU. The MMU may obtain, from a stored first page table based on the destination address of the memory area, the read/write attribute of the page table entry corresponding to the destination address. When the read/write attribute of the page table entry corresponding to the destination address in the first page table is not a read only attribute, it indicates that data is allowed to be written into the memory area. Otherwise, when the read/write attribute of the page table entry corresponding to the destination address in the first page table is a read only attribute, it may be determined that data is not allowed to written into the memory area.

The first page table stores a mapping relationship between a logical address in address space of a CPU and a physical address of an allocated area in an SCM. When the CPU core in the storage node accesses the SCM medium, the CPU core may transfer a to-be-accessed logical address of a memory area to the MMU, and the MMU may convert the to-be-accessed logical address into a corresponding physical address by using the first page table.

For example, the first page table stored in the MMU may be shown in Table 1. The first page table is indexed by a page number, and the page number is determined based on a logical address. For example, for a 16-bit logical address, four most significant bits of all possible 16-bit logical addresses may be used as page numbers in the first page table, and each page number may be used to indicate one logical address range. Each page number corresponds to one page table entry, and the page table entry corresponding to each page number includes a page box number and a protection bit. The page box number may be used to indicate a physical address range. The protection bit may be used to indicate an access form of a corresponding physical address. When the protection bit is a first value, the protection bit is used to indicate that a read/write attribute of a memory area corresponding to the physical address range indicated by the page box number is a read only attribute. When the protection bit is a second value, the protection bit is used to indicate that a read/write attribute of a memory area corresponding to the physical address range indicated by the page box number is not a read only attribute, to be specific, data may be read and written. The first value is different from the second value. As shown in Table 1, the first value may be 1, and the second value may be 0.

TABLE 1

| Page number | Page box number | Protection bit |
| --- | --- | --- |
| 0 | 010 | 0 |
| 1 | 001 | 1 |
| 2 | 110 | 0 |
| 3 | 000 | 0 |
| ... | ... | ... |

Optionally, when the write request is a write request received by the I/O device, it indicates that for the write request, the SCM medium may be accessed through the I/O device. In this case, the storage node may send the destination address of the memory area to the IOMMU of the storage node. The IOMMU may obtain, from a stored second page table based on the destination address, the read/write attribute of the page table entry corresponding to the destination address. When the read/write attribute of the page table entry corresponding to the destination address in the second page table is not a read only attribute, it indicates that data is allowed to be written into the memory area. Otherwise, when the read/write attribute of the page table entry corresponding to the destination address in the second page table is a read only attribute, it may indicate that only reading of data is allowed in the memory area and writing of data is not allowed in the memory area. That is, the storage node cannot write data into the memory area again, and data is not allowed to be written into the memory area.

It should be noted that the second page table stores a mapping relationship between a logical address in address space of the I/O device and a physical address of an allocated area in the SCM medium. When the I/O device in the storage node accesses the SCM medium, the I/O device may transfer a to-be-accessed logical address of a memory area to the IOMMU, and the IOMMU may convert the logical address into a corresponding physical address by using the second page table.

Optionally, in a possible case, it is possible that the storage node has not allocated, from the SCM medium, a memory area to a program corresponding to the to-be-written data. In this case, the address indication information carried in the write request sent by the client node may include only a data volume of the to-be-written data. Based on this, after receiving the write request from the client node, the storage node may further detect, based on the write request, whether the SCM medium has a memory area allocated to the to-be-written data. When the SCM medium does not have a memory area allocated to the to-be-written data, the storage node may first allocate a memory area to the to-be-written data before performing this step. When allocating the memory area to the to-be-written data, the storage node may allocate a corresponding memory area to an application program based on the application program corresponding to the to-be-written data. In this case, space of the allocated memory area is greater than space occupied by the to-be-written data. After allocating the memory area, the storage node may obtain length information of an area into which data is written in the allocated memory area, that is, an offset. Because the memory area is newly allocated, and no data has been written into the memory area, the length information is 0. Based on the length information, the storage node may use a start logical address of the allocated memory area as a start logical address of the memory area corresponding to the to-be-written data. Subsequently, the storage node determines, based on the start logical address and the data length of the to-be-written data, an end logical address of the memory area corresponding to the to-be-written data. All logical addresses between the start logical address and the end logical address are used as destination addresses of the memory area. Because the memory area is allocated when the write request is received, no data has been written into the memory area. In this case, the read/write attribute of the memory area is not a read only attribute. Therefore, the storage node does not need to detect whether the read/write attribute of the page table entry corresponding to the obtained destination address is a read only attribute, but directly writes the to-be-written data into the memory area.

Step 303: Write the to-be-written data into the memory area in an append write manner when data is allowed to be written into the memory area.

When determining that data is allowed to be written into the memory area corresponding to the to-be-written data, the storage node may write the to-be-written data included in the write request into the memory area in an append-only write manner.

For example, when the write request is a write request that needs to access the SCM medium through the I/O device, the storage node may send the destination address of the memory area determined in the foregoing step to the IOMMU. The IOMMU may convert the destination address of the memory area into a corresponding physical address, and further write the to-be-written data into the memory area in the append write manner based on the physical address. It should be noted that it can be learned based on the foregoing description that the IOMMU stores the second page table, and the second page table stores a mapping relationship between a logical address accessible to the input/output device and a physical address. Based on this, the IOMMU may search the second page table for the physical address corresponding to the destination address of the memory area.

Optionally, when the write request is a write request that needs to access the SCM medium through a CPU, the storage node may send the destination address determined in the foregoing step to the MMU. The MMU may convert the destination address into a corresponding physical address, and further write the to-be-written data into the memory area in the append write manner based on the physical address. It should be noted that it can be learned based on the foregoing description that the MMU stores the first page table, and the first page table stores a mapping relationship between a logical address accessible to the CPU core and a physical address. Based on this, the MMU may search the first page table for the physical address corresponding to the destination address.

After writing the to-be-written data into the memory area, the storage node may persist the written data. For example, the storage node may read the written data from the memory area, and perform cyclic redundancy check (CRC) on the read data. When the check succeeds, it indicates that data persistence is completed.

It should be noted that, in this embodiment of this application, the to-be-written data is written into the memory area in the append write manner. Therefore, for a process writing the to-be-written data, when writing data again subsequently, the process writes the data into another area, outside the memory area, into which no data is written, and does not perform a write operation on the memory area. However, the process may perform a read operation on the memory area. That is, the process may read data in the memory area. It can be learned that after the to-be-written data is written into the memory area in this manner, the memory area naturally becomes a read only area for a corresponding process.

Figure 4:
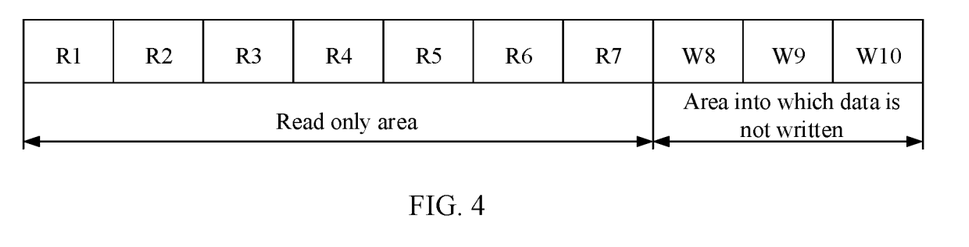
FIG. 4 is a schematic diagram of an area into which data is written and an area into which data is not written that are included in an allocated memory area after data is written into the memory area according to an embodiment of this application.

FIG. 4 is a schematic diagram of an area into which data is written and an area into which data is not written that are included in an allocated memory area after data is written into the allocated memory area according to an embodiment of this application. As shown in FIG. 4, memory areas R1 to R7 are areas into which data is written in an append write manner. Because data has been written in the append write manner, data is not written into the memory areas R1 to R7 subsequently, thereby forming a read only area. W8 to W10 are areas into which data is not written, and data subsequently continues to be written into these areas.

Step 304: Set a read/write attribute corresponding to the destination address of the memory area into which data has been written, so that the data in the memory area cannot be modified.

After the to-be-written data is written into the memory area in the append write manner, a process corresponding to the to-be-written data does not write data into the memory area again. However, when hardware of the storage node is faulty or an error program exists, another process may perform a write operation on the memory area. In this case, in this embodiment of this application, to avoid that the error program accidentally overwrites the data written into the memory area, a page table entry corresponding to the destination address of the memory area into which data has been written may be set to a read only attribute, so that the data in the memory area cannot be modified.

In a possible implementation, when the to-be-written data is written into the memory area through the CPU core and the MMU, the storage node may set the page table entry corresponding to the destination address in the first page table stored in the MMU to a read only attribute. Specifically, the storage node may set the read/write attribute of the page table entry corresponding to the destination address in the first page table stored in the MMU to the read only attribute by using a system call (syscall).

In this embodiment of this application, based on the first page table shown in Table 1, the storage node may obtain, by using a system call, the first page table stored in the MMU. Then, the storage node may determine to obtain at least one page number based on the destination address, search the first page table for a page table entry corresponding to each determined page number, and set a protection bit that is in the corresponding page table entry and that is used to indicate the read/write attribute of the page table entry to a first value. The first value is used to indicate that the memory area corresponding to the physical address range indicated by the page box number in the corresponding page table entry has a read only attribute.

It should be noted that the to-be-written data is written into the memory area in the append write manner in this embodiment of this application, so that the memory area becomes a read only area for a process corresponding to the to-be-written data. Therefore, the storage node may set the page table entry corresponding to the destination address in the first page table to a read only attribute. However, for a related technology, a CPU accesses an SCM medium in a local update manner. Therefore, after data is written into an area, a page table entry corresponding to a logical address of the area in a first page table cannot be set to a read only attribute. Therefore, data in the area cannot be protected.

After setting the page table entry corresponding to the destination address in the first page table to the read only attribute, when subsequently receiving a write request for accessing the memory area through the CPU, the storage node may detect, through the MMU, whether a read/write attribute of a page table entry corresponding to the logical address that the received write request requests to access in the first page table is a read only attribute. When the read/write attribute of the page table entry corresponding to the logical address is the read only attribute, first abnormality information may be generated. The first abnormality information is used to indicate that the write request is an abnormal request.

It should be noted that for the memory area into which data is written in the foregoing manner, the page table entry corresponding to the logical address of the memory area into which data is written has been set to a read only attribute in the first page table. Therefore, when the storage node subsequently receives a write request for the areas that have been set to read-only again, and data needs to be written through the CPU, the storage node may send, to the MMU, the logical address carried in the write request. The MMU determines, based on the read/write attribute of the page table entry corresponding to the logical addresses of the areas in the first page table, that the areas are read only areas. In this case, the MMU generates an abnormality signal. The storage node may determine, based on the abnormality signal, that the write request is an abnormal request. In other words, access performed through the CPU to the memory area in which data has been written is illegal. In this case, the storage node may refuse to respond to the write request, and generate abnormality information based on the abnormality signal generated by the MMU, to indicate that the write request is an abnormal request. As can be seen, by setting the page table entry corresponding to the memory area into which data has been written in the first page table to a read only attribute, the data in the memory area is prevented from being accidentally overwritten by another program, thereby implementing read only protection on the data in the memory area.

In addition, the first abnormality information may include information used to indicate that the write request is an abnormal request, and may further include process information of the write request. The process information is information used to indicate a program corresponding to the write request. In this way, subsequently, based on the first abnormality information, a program segment that attempts to overwrite the read-only memory area into which data is written may be determined, so that a user can conveniently locate the program in which an error occurs.

Optionally, in another possible implementation, when the to-be-written data is written into the memory area through the I/O device, the storage node may set the page table entry corresponding to the destination address in the second page table stored in the IOMMU to a read only attribute. Specifically, the storage node may set the read/write attribute of the page table entry corresponding to the destination address in the second page table stored in the IOMMU to the read only attribute by using a syscall.

After setting the page table entry corresponding to the destination address in the second page table to the read only attribute, when subsequently receiving a write request for accessing the memory area through the I/O device, the storage node may detect, through the IOMMU, whether a read/write attribute of a page table entry corresponding to the logical address of the area that the write request received again requests to access in the second page table is a read only attribute. When the read/write attribute of the page table entry corresponding to the logical address of the area is the read only attribute, second abnormality information is generated. The second abnormality information is used to indicate that the write request is an abnormal request, and the second abnormality information includes process information of the write request.

It should be noted that for the memory area into which data is written in the foregoing manner, the page table entry corresponding to the logical address of the memory area into which data is written has been set to a read only attribute in the second page table. Therefore, when the storage node subsequently receives a write request for the areas that have been set to read-only again, and data needs to be written through the I/O device, the storage node may send, to the IOMMU, the logical addresses of the areas carried in the write request. The IOMMU detects, based on the second page table, the read/write attribute of the page table entry corresponding to the logical address is a read only attribute. In this case, the IOMMU generates an abnormality signal. The storage node may determine, based on the abnormality signal, that the write request is an abnormal request. In other words, access performed through the I/O device to the memory area in which data has been written is illegal. In this case, the storage node may refuse to respond to the write request, and generate the second abnormality information based on the abnormality signal generated by the IOMMU, to indicate that the write request is an abnormal request. As can be seen, by setting the page table entry corresponding to the memory area into which data has been written in the second page table to a read only attribute, the data in the memory area is prevented from being accidentally overwritten again by the I/O device, thereby implementing read only protection on the data in the memory area. In this way, even if the I/O device is faulty, the data in the memory areas is not damaged. In addition, compared with an existing technology in which the I/O device accesses an SCM by using a physical address in a direct memory access (DMA) manner, a malicious attack from a DMA can be avoided.

It should be noted that, in the embodiments of this application, after writing the to-be-written data into the memory area, the storage node may set the page table entry corresponding to the destination address in the first page table to the read only attribute, set the page table entry corresponding to the destination address in the second page table to the read only attribute, or set the page table entries corresponding to the destination addresses in both the first page table and the second page table to read only attribute.

In the embodiments of this application, the write request is received, the destination address of the memory area corresponding to the to-be-written data is obtained based on the address indication information included in the write request, and the to-be-written data is written into the memory area in the append write manner. After the to-be-written data is written into the memory area, the read/write attribute corresponding to the destination address is set, so that the data in the memory area cannot be modified, thereby effectively avoiding illegal tampering with the data stored in the memory area, and implementing read-only protection on data in the SCM medium.

The foregoing embodiments mainly describe specific implementation manners in which the storage node accesses data. As can be learned from the foregoing embodiments, when writing into data, the client node may access the SCM medium through the CPU of the storage node, or may access the SCM medium through the I/O device of the storage node. Next, an implementation process in which the client node writes data to the storage node in the distributed storage system shown in FIG. 1 is described with reference to FIG. 5A to FIG. 5B.

Figure 5A:
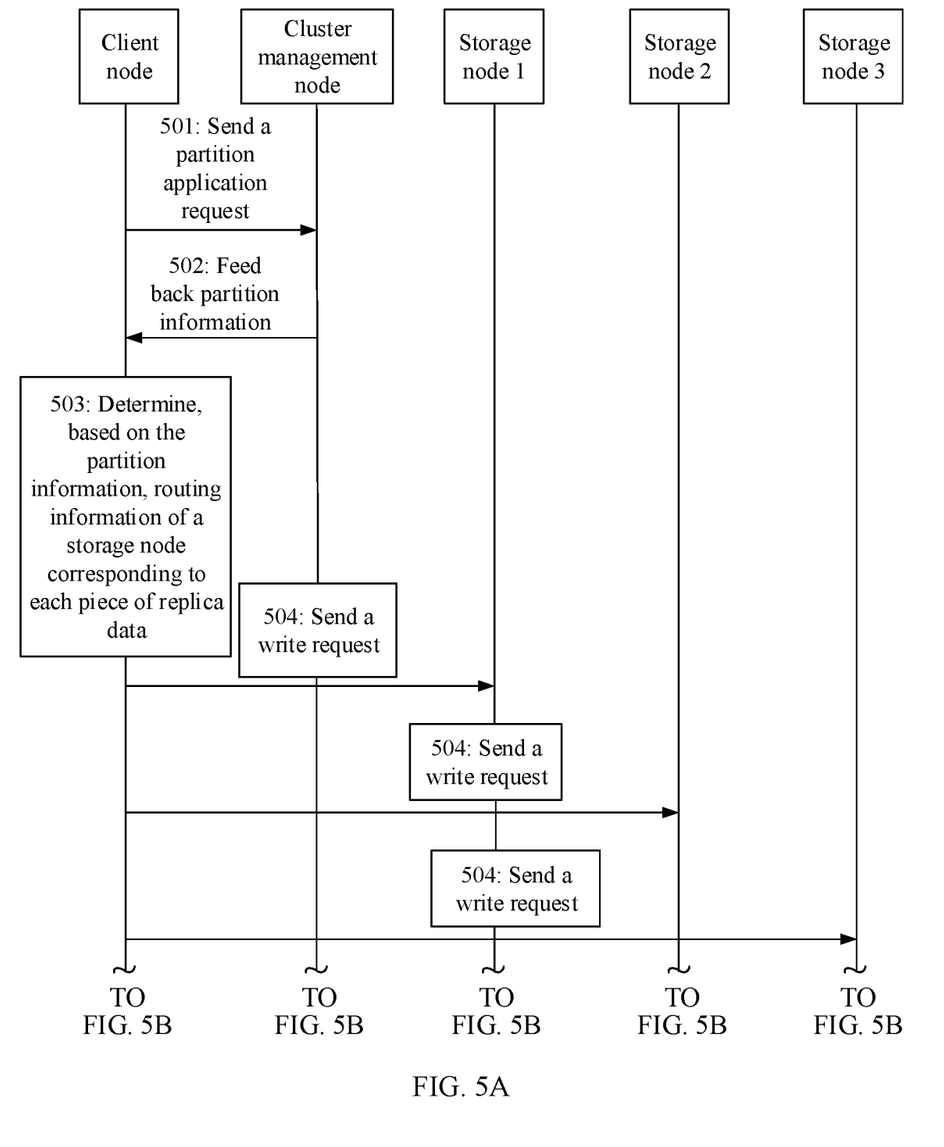
FIG. 5A and FIG. 5B are a flowchart of another data access method according to an embodiment of this application.
Figure 5B:
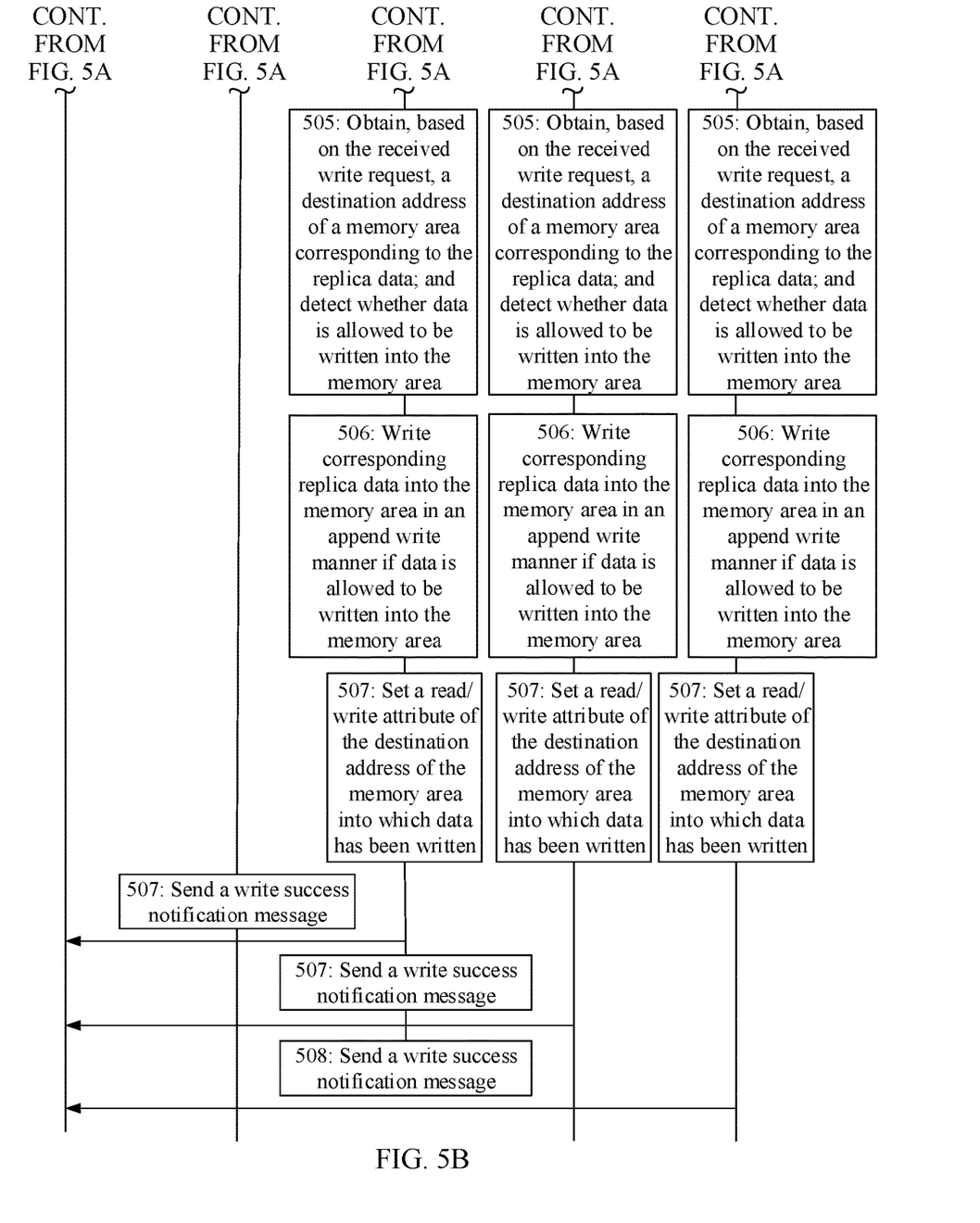

FIG. 5A and FIG. 5B are a flowchart of a data access method according to an embodiment of this application. The method may be applied to the distributed storage system shown in FIG. 1. Referring to FIG. 5A to FIG. 5B, the method includes the following steps.

Step 501: A client node sends a partition application request to a cluster management node, where the partition application request is used to apply, from the cluster management node, for a partition used to store a plurality pieces of replica data.

It should be noted that, in the distributed storage system, a replica mechanism is usually used to ensure reliability of stored data. When the client node needs to store data into a storage node, the client node may generate a plurality pieces of replica data, where all replica data is the same. Then, the client node may send, to the cluster management node, the partition application request used to apply for a partition. In this embodiment of this application, three pieces of replica data are used as an example for description.

Step 502: The cluster management node feeds back partition information to the client node.

After receiving the partition application request, the cluster management node may determine a proper partition based on a load status of each partition in the current system; allocate, from storage nodes included in the partition to the plurality pieces of replica data of the client node, storage nodes whose quantity is the same as a quantity of pieces of replica data; and feed back partition information of the determined partition to the client node. The partition information may include a partition identifier of the determined partition and a node identifier of a storage node in the partition allocated to the client node.

Optionally, in a possible implementation, after determining the proper partition, the cluster management node may directly send identifiers of all storage nodes included in the partition to the client node. In this case, the client node may select, from all the determined partition, storage nodes whose quantity is the same as the quantity of pieces of replica data.

For example, when there are three pieces of replica data, the quantity of storage nodes selected from the determined partition is 3.

Step 503: The client node determines, based on the partition information, routing information of a storage node corresponding to each piece of replica data.

After receiving the partition information, the client node may determine, based on the partition identifier and the identifier of the storage node corresponding to each piece of replica data that are included in the partition information, the routing information of the storage node corresponding to each piece of replica data.

Step 504: The client node sends, based on the routing information of the storage node corresponding to each piece of replica data, a write request to the storage node corresponding to each piece of replica data, where the write request includes a corresponding piece of replica data and corresponding address indication information.

The write request may be an append replica data request. For a specific description of the append request, refer to related content in the foregoing embodiments.

In addition, in this embodiment of this application, an operation of sending, by the client node, a write request to a storage node corresponding to each piece of replica data may be concurrently performed.

Step 505: Each storage node obtains, based on the address indication information included in the received write request, a destination address of a memory area corresponding to the replica data; and detects whether data is allowed to be written into the memory area.

For a storage node corresponding to each piece of replica data, the storage node may obtain, with reference to the implementation described in step 302 in the foregoing embodiment and based on the address indication information, a memory area corresponding to the replica data; and detect whether data is allowed to be written into the memory area.

Step 506: Write corresponding replica data into the memory area in an append write manner when data is allowed to be written into a memory area on each storage node.

For the storage node corresponding to each piece of replica data, when the storage node determines that data is allowed to be written into the memory area, the storage node may write, with reference to step 303 in the foregoing embodiment, replica data included in the write request received by the storage node into the corresponding memory area. Details are not described in this embodiment of this application herein again.

Step 507: Each storage node sets a read/write attribute of a destination address of the memory area into which data has been written, so that the data in the memory area cannot be modified.

For the storage node corresponding to each piece of replica data, after the replica data is written into the corresponding memory area, a page table entry corresponding to a logical address of the memory area into which data has been written may be set to a read only attribute with reference to the related implementation described in step 303 in the foregoing embodiment.

Step 508: Each storage node sends a write success notification message to the client node.

For the storage node corresponding to each piece of replica data, after setting the page table entry corresponding to the logical address of the memory area into which data has been written to the read only attribute, the storage node may feed back the write success notification message to the client node to notify the client node that corresponding replica data is successfully stored.

In this embodiments of this application, the client node may send the write request to the storage node. After receiving the write request, the storage node obtains, based on the address indication information included in the write request, a destination address of a memory area corresponding to to-be-written data, and writes the to-be-written data into the memory area in an append write manner. After the data is written, a read/write attribute corresponding to the destination address may be set, so that the data in the memory area cannot be modified, thereby effectively avoiding illegal tampering with the data stored in the memory area, and implementing read-only protection on data in an SCM medium.

The following describes the data access apparatus provided in the embodiments of this application.

Figure 6:
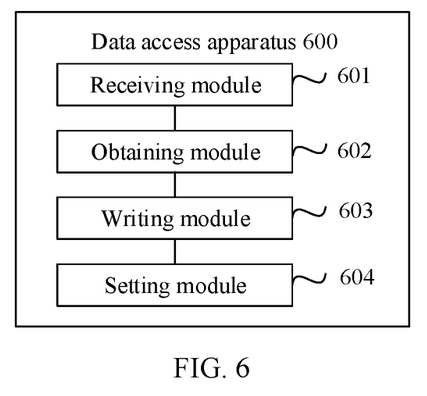
FIG. 6 is a schematic structural diagram of a data access apparatus according to an embodiment of this application.

Referring to FIG. 6, an embodiment of this application provides a data access apparatus 600. The apparatus 600 includes:

- a receiving module 601, configured to perform step 301 in the foregoing embodiment, where the receiving module 601 may be implemented by the I/O device or the processor in the storage node shown in FIG. 2;
- an obtaining module 602, configured to perform step 302 in the foregoing embodiment, where the obtaining module 602 may be implemented by the processor in the storage node shown in FIG. 2;
- a writing module 603, configured to perform step 303 or step 506 in the foregoing embodiment, where the writing module 603 may be implemented by the CPU and the MMU that are shown in FIG. 2, or the writing module 603 may be implemented by the I/O device and the IOMMU that are shown in FIG. 2; and
- a setting module 604, configured to perform step 304 or step 507 in the foregoing embodiment, where the setting module 604 may be implemented by the processor shown in FIG. 2.

Optionally, the setting module 604 is specifically configured to set a read/write attribute of a page table entry corresponding to a destination address to a read only attribute.

Optionally, the apparatus further includes:

- a determining module, configured to: before the writing module writes to-be-written data into a memory area, determine that the read/write attribute of the page table entry corresponding to the destination address is not the read only attribute, where the determining module may be implemented by the processor shown in FIG. 2.

Optionally, the read/write attribute of the page table entry is stored in a memory management unit MMU.

Optionally, the read/write attribute of the page table entry is stored in an input-output memory management unit IOMMU.

In conclusion, in the embodiments of this application, the write request is received, the destination address of the memory area corresponding to the to-be-written data is obtained based on the address indication information included in the write request, and the to-be-written data is written into the memory area in the append write manner. After the to-be-written data is written into the memory area, the read/write attribute corresponding to the destination address is set, so that the data in the memory area cannot be modified, thereby effectively avoiding illegal tampering with the data stored in the memory area, and implementing read-only protection on data in the SCM medium.

It may be noted that data access apparatus provided by the foregoing embodiments are performing a data access, only division of the foregoing function modules is taken as an example for illustration. In actual application, the foregoing functions can be allocated to different function modules and implemented according to a requirement, that is, an inner structure of a device is divided into different function modules to implement all or some of the functions described above. In addition, the data access apparatus provided in the foregoing embodiment and the data access method embodiment belong to a same concept. For a specific implementation process thereof, refer to the method embodiment, and details are not described herein again.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

What is claimed is:

1. A data access method, the method comprising:
    sending, by a client device, a partition application request to a cluster management node, wherein the partition application request is used to apply, from the cluster management node, for a partition used to store a plurality of pieces of replica data, wherein each piece of replica data is the same;
    receiving, by the client device, partition information from the cluster management node, wherein the partition information includes identifiers for a plurality of storage nodes, wherein a number of storage nodes in the plurality of storage nodes is equal to a number of pieces of replica data in the plurality of pieces of replica data;
    sending, by the client device, a write request to each storage node of the plurality of storage nodes, wherein each write request comprises a piece of replica data and address indication information for the corresponding storage node, wherein for each storage node of the plurality of storage nodes, the piece of replica data included in the write request is written in an append-only write manner in the storage node based on the address indication information; and
    receiving, by the client device from each storage node of the plurality of storage nodes, a write success notification message after the piece of replica data is written into each corresponding storage node, wherein, for each storage node of the plurality of storage nodes, a read/write attribute corresponding to a destination address where the piece of replica data is stored is set to a read only attribute.

2. The method according to claim 1, wherein the read/write attribute corresponding to the destination address is set to the read only attribute in a first page table in each storage node of the plurality of storage nodes.

3. The method according to claim 2, wherein the read/write attribute corresponding to the destination address is not the read only attribute in the first page table before the piece of replica data is stored at the destination address for each storage node of the plurality of storage nodes.

4. An apparatus, comprising:
    a memory storing instructions; and
    a processor configured to execute the instructions to cause the apparatus to be is configured to:
        send a partition application request to a cluster management node, wherein the partition application request is used to apply, from the cluster management node, for a partition used to store a plurality of pieces of replica data, wherein each piece of replica data is the same;
        receive partition information from the cluster management node, wherein the partition information includes identifiers for a plurality of storage nodes, wherein a number of storage nodes in the plurality of storage nodes is equal to a number of pieces of replica data in the plurality of pieces of replica data;
        send a write request to each storage node of the plurality of storage nodes, wherein each write request comprises a piece of replica data and address indication information for the corresponding storage node, wherein for each storage node of the plurality of storage nodes, the piece of replica data included in the write request is written in an append-only write manner in the storage node based on the address indication information;
        receive, from each storage node of the plurality of storage nodes, a write success notification message after the piece of replica data is written into each corresponding storage node, wherein, for each storage node of the plurality of storage nodes, a read/write attribute corresponding to a destination address where the piece of replica data is stored is set to a read only attribute.

5. The apparatus according to claim 4, wherein the read/write attribute corresponding to the destination address is set to the read only attribute in a first page table in each storage node of the plurality of storage nodes.

6. The apparatus according to claim 5, wherein the read/write attribute corresponding to the destination address is not the read only attribute in the first page table before the piece of replica data is stored at the destination address for each storage node of the plurality of storage nodes.

* * * * *